US012060249B2

(12) United States Patent
Saarela et al.

(10) Patent No.: US 12,060,249 B2
(45) Date of Patent: Aug. 13, 2024

(54) METHOD AND A CONTROL APPARATUS FOR CONTROLLING AN ELEVATOR SYSTEM

(71) Applicant: KONE Corporation, Helsinki (FI)

(72) Inventors: Sami Saarela, Helsinki (FI); Aki Haikonen, Helsinki (FI); Klaus Mäkelä, Helsinki (FI); Sakke Ahoniemi, Helsinki (FI)

(73) Assignee: KONE Corporation, Helsinki (FI)

( * ) Notice: Subject to any disclaimer, the term of this patent is extended or adjusted under 35 U.S.C. 154(b) by 1436 days.

(21) Appl. No.: 16/504,674

(22) Filed: Jul. 8, 2019

(65) Prior Publication Data

US 2019/0330013 A1 Oct. 31, 2019

Related U.S. Application Data

(63) Continuation of application No. PCT/FI2017/050195, filed on Mar. 21, 2017.

(51) Int. Cl.
*B66B 5/00* (2006.01)
*B66B 1/32* (2006.01)
*B66B 1/34* (2006.01)

(52) U.S. Cl.
CPC .............. *B66B 5/0012* (2013.01); *B66B 1/32* (2013.01); *B66B 1/3453* (2013.01); *B66B 1/3476* (2013.01); *B66B 5/005* (2013.01); *B66B 2201/23* (2013.01)

(58) Field of Classification Search
CPC ....... B66B 5/0012; B66B 1/32; B66B 1/3453; B66B 1/3476; B66B 5/005; B66B 2201/23; B66B 2201/222; B66B 13/24
See application file for complete search history.

(56) References Cited

U.S. PATENT DOCUMENTS

| | | | | |
|---|---|---|---|---|
| 4,797,675 A | | 1/1989 | Ovaska | |
| 6,202,797 B1 | | 3/2001 | Skolnick et al. | |
| 9,359,171 B1 | * | 6/2016 | Nowel | A42B 3/0453 |

(Continued)

FOREIGN PATENT DOCUMENTS

| | | | | |
|---|---|---|---|---|
| CN | 105460713 A | * | 4/2016 | B66B 1/06 |
| CN | 110234588 A | * | 9/2019 | B66B 1/32 |

(Continued)

OTHER PUBLICATIONS

Chinese Office Action and Search Report for Chinese Application No. 201780085340.0 dated May 8, 2021, with English translation.

*Primary Examiner* — Jeffrey Donels
(74) *Attorney, Agent, or Firm* — Birch, Stewart, Kolasch & Birch, LLP

(57) ABSTRACT

According to an aspect, there is provided a method for controlling an elevator system. The method comprises causing transmission of radio frequency signals with at least one radio frequency sensor attached to at least one element movable in an elevator shaft of an elevator system, receiving, from the at least one radio frequency sensor measurement data representing radio frequency signals reflected from at least one object and captured with the at least one radio frequency sensor, causing identification, based on the measurement data, of at least one object; and controlling operation of the elevator system in response to identifying the at least one object based on the measurement data.

20 Claims, 3 Drawing Sheets

(56) References Cited

U.S. PATENT DOCUMENTS

| | | | | |
|---|---|---|---|---|
| 2011/0073416 | A1* | 3/2011 | Nowel | B66B 13/24 187/390 |
| 2011/0094832 | A1 | 4/2011 | Monzon et al. | |
| 2019/0062109 | A1* | 2/2019 | Nanjappan | B66B 5/0056 |
| 2019/0084796 | A1* | 3/2019 | Buckley | B66B 5/005 |

FOREIGN PATENT DOCUMENTS

| | | | | | |
|---|---|---|---|---|---|
| EP | 3433197 | A1 | * | 1/2019 | B66B 5/005 |
| EP | 3354612 | B1 | * | 10/2020 | B66B 5/0031 |
| GB | 2389415 | A | * | 12/2003 | B66B 1/3476 |
| WO | WO 98/52859 | A1 | | 11/1998 | |
| WO | WO 2006/067542 | A1 | | 6/2006 | |
| WO | WO 2008/013515 | A2 | | 1/2008 | |
| WO | WO-2008013515 | A2 | * | 1/2008 | B66B 1/3476 |
| WO | WO 2011/012768 | A | | 2/2011 | |
| WO | WO-2011012768 | A1 | * | 2/2011 | B66B 1/20 |
| WO | WO 2014/095511 | A1 | | 6/2014 | |
| WO | WO 2015/059821 | A1 | | 4/2015 | |
| WO | WO 2016/085795 | A1 | | 6/2016 | |
| WO | WO-2016085795 | A1 | * | 6/2016 | B66B 1/28 |
| WO | WO 2017/162552 | A1 | | 9/2017 | |
| WO | WO-2017162552 | A1 | * | 9/2017 | B66B 5/005 |

* cited by examiner

METHOD AND A CONTROL APPARATUS FOR CONTROLLING AN ELEVATOR SYSTEM

CROSS REFERENCE TO RELATED APPLICATIONS

This application is a Continuation of PCT International Application No. PCT/FI2017/050195, filed on Mar. 21, 2017, which is hereby expressly incorporated by reference into the present application.

BACKGROUND

When an elevator car moves in an elevator shaft, it has to be ensured that there are no persons in the elevator shaft pit or on the roof of the elevator car to prevent a person from crushing. Although a maintenance person or an unauthorized person in some cases may be detected using other security measures, it may happen that the unauthorized person or the maintenance person ends up on the roof of the elevator car or in the elevator shaft pit without being detected. In that case, the conventional security measures may not be able to provide indication about the maintenance or unauthorized person being at a crushing risk or to prevent a person from injury caused be shearing or crushing against shaft or components on shaft walls as the elevator moves.

Additionally, a load weighting device may be used to estimate the number of passenger in an elevator car. The load weighting device, however, provides only static estimation information about the number of passengers in the elevator car.

In general, it would be beneficial to have a simple solution that would enable detecting persons both in the elevator shaft and in the elevator car and also at each landing.

SUMMARY

A solution is provided that enables detecting persons both in the elevator shaft and in the elevator car. The solution uses radio frequency signals to detecting persons both in the elevator shaft and in the elevator car and additionally also at each landing. A radio frequency sensor may be attached to an elevator car, or alternatively or additionally, in a counterweight of the elevator car. The radio frequency sensor transmits radio frequency signals and receives reflected signals from at least one object. Based on the reflected signals it is possible to identify one or more persons in an elevator shaft, in the elevator car or at a floor waiting for an elevator car to serve them.

According to a first aspect of the invention, there is provided a method for controlling an elevator system. The method comprises causing transmission of radio frequency signals with at least one radio frequency sensor attached in at least one element movable in an elevator shaft of an elevator system, receiving, from the at least one radio frequency sensor, measurement data representing radio frequency signals reflected from at least one object and captured with the at least one radio frequency sensor, causing identification, based on the measurement data, of at least one object, and controlling operation of the elevator system in response to identifying the at least one object based on the measurement data.

In an embodiment, the method further comprises identifying, based on the measurement data, a person on the roof of an elevator car, and allowing operation of an elevator car in the elevator shaft only in a service mode.

In an embodiment, the method further comprises identifying, based on the measurement data, a person in the elevator shaft, and restricting movements of an elevator car in the elevator shaft.

In an embodiment, the method further comprises triggering the transmission of the radio frequency signals with the at least one radio frequency sensor before causing movement of the elevator car.

In an embodiment, the method further comprises determining the number of passengers in an elevator car based on the identifying, and taking into account the determined number of passengers in call allocations in the elevator system.

In an embodiment, the method further comprises identifying, based on the measurement data, at least one passenger leaning against or being too close to elevator car doors or landing doors, and preventing opening of the elevator car doors or landing doors when identifying, based on the measurement data, that the at least one passenger leaning against or being too close to the elevator car doors or landing doors.

In an embodiment, the method further comprises receiving a landing call, triggering the transmission of the radio frequency signals with the at least one radio frequency sensor when being in the vicinity of the floor from which the landing call was received, determining, based on the measurement data, the number of passengers waiting at the floor from which the landing call was received, and taking into account the determined number of passengers when allocating the landing call.

In an embodiment, the method further comprises identifying, based on the measurement data, at least one passenger in an elevator car, determining, based on the measurement data, that the at least one passenger is motionless in the elevator car, and initiating an emergency action.

In an embodiment, in any combination of the previous embodiments, the at least one element movable in an elevator shaft comprises at least one of an elevator car and a counterweight of the elevator car.

In an embodiment, in any combination of the previous embodiment, the radio frequency signals comprise Wi-Fi signals.

According to a second aspect of the invention, there is provided a control apparatus of an elevator system. The control apparatus comprises means for causing transmission of radio frequency signals with at least one radio frequency sensor attached in at least one element movable in an elevator shaft of an elevator system, means for receiving, from the at least one radio frequency sensor, measurement data representing radio frequency signals reflected from at least one object and captured with the at least one radio frequency sensor, means for causing identification, based on the measurement data, of at least one object, and means for controlling operation of the elevator system in response to identifying the at least one object based on the measurement data.

In an embodiment, the control apparatus further comprises means for identifying, based on the measurement data, a person on the roof of an elevator car, and means for allowing operation of the elevator car only in a service mode.

In an embodiment, the control apparatus further comprises means for identifying, based on the measurement data, a person in the elevator shaft, and means for restricting movements of an elevator car in the elevator shaft.

In an embodiment, the control apparatus further comprises means for triggering the transmission of the radio frequency signals with the at least one radio frequency sensor before causing movement of the elevator car.

In an embodiment, the control apparatus further comprises means for determining the number of passengers in an elevator car based on the identifying, and means for taking into account the determined number of passengers in call allocations in the elevator system.

In an embodiment, the control apparatus further comprises means for identifying, based on the measurement data, that at least one passenger leans against or is too close to elevator car doors or landing doors, and preventing opening of the elevator car doors or landing doors when identifying, based on the measurement data, that the at least one passenger leans against or is too close to the elevator car doors or landing doors.

In an embodiment, the control apparatus further comprises means for receiving a landing call, means for triggering the transmission of the radio frequency signals with the at least one radio frequency sensor when being in the vicinity of the floor from which the landing call was received, means for determining, based on the measurement data, the number of passengers waiting at the floor from which the landing call was received, and means for taking into account the determined number of passengers when allocating the landing call.

In an embodiment, the control apparatus further comprises means for identifying, based on the measurement data, at least one passenger in an elevator car, means for determining, based on the measurement data, that the at least one passenger is motionless in the elevator car, and means for initiating emergency action.

In an embodiment, in any combination of the previous embodiments, the at least one element movable in an elevator shaft comprises at least one of an elevator car and a counterweight of the elevator car.

In an embodiment, in any combination of the previous embodiments, the radio frequency signals comprise Wi-Fi signals.

According to a third aspect of the invention, there is provided an elevator system. The elevator system comprises an elevator shaft, at least one element movable in the elevator shaft, at least one radio frequency sensor attached in the at least one element, and a control apparatus of the second aspect.

According to a fourth aspect of the invention, there is provided a computer program comprising program code, which when executed by at least one processing unit, causes the at least one processing unit to perform the method of the first aspect.

In one embodiment, the computer program is embodied on a computer readable medium.

According to a fifth aspect of the invention, there is provided an apparatus for controlling an elevator system. The apparatus comprises at least one processor and at least one memory connected to the at least one processor. The at least one memory stores program instructions that, when executed by the at least one processor, cause the apparatus to cause transmission of radio frequency signals with at least one radio frequency sensor attached in at least one element movable in an elevator shaft of an elevator system, receive, from the at least one radio frequency sensor, measurement data representing radio frequency signals reflected from at least one object and captured with the at least one radio frequency sensor, cause identification, based on the measurement data, of at least one object, and control operation of the elevator system in response to identifying the at least one object based on the measurement data.

The above discussed means may be implemented, for example, using at least one processor, at least one processor and at least one memory connected to the at least one processor, or at least one processor, at least one memory connected to the at least one processor and an input/output interface connected to the at least one processor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1A:
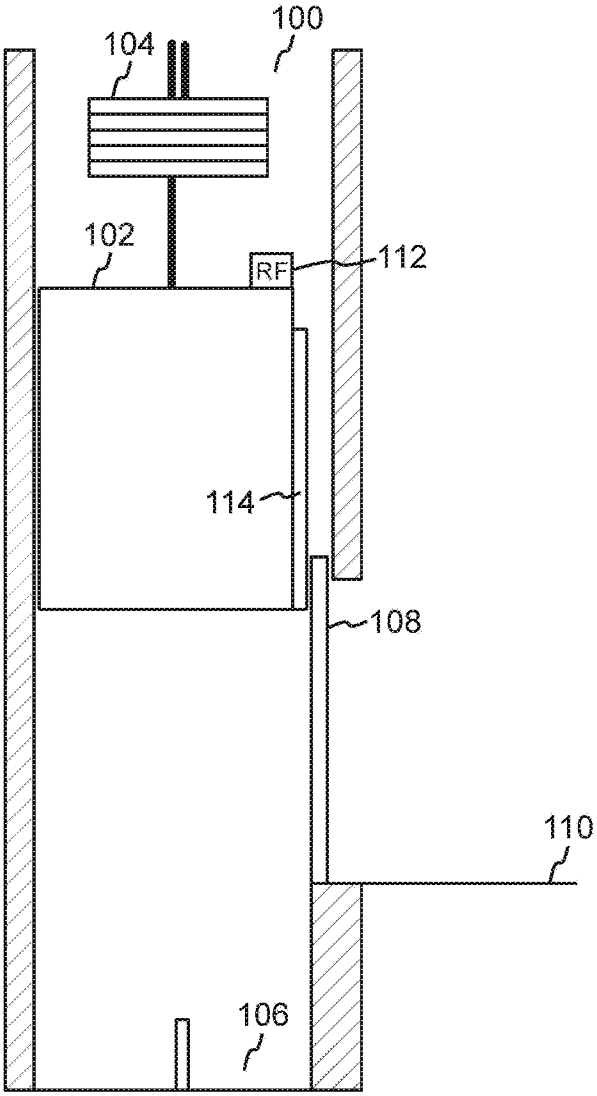
FIG. 1A illustrates an elevator system according to an embodiment.

FIG. 1A illustrates an elevator system according to an embodiment. The elevator system comprises an elevator shaft 100 in which an elevator car 102 moves to serve different floors. Although FIG. 1A illustrates only one floor 110, it is evident that there may be any number of floors. Similarly, although FIG. 1A illustrates only one elevator shaft 100, there may be more than one elevator shaft in the elevator system. A counterweight 104 relating to the elevator car 102 moves in the elevator shaft 100 together with the elevator car 102 but in the opposite direction.

The elevator system comprises also a radio frequency sensor 112 may be attached to the elevator car 102. The radio frequency sensor 112 may be positioned or directed so that it transmits its radio frequency signals at least in the vertical direction. The radio frequency sensor 112 receives, in response to its transmission, signals reflected from at least one object. An object may refer to a stationary and structural part or parts of the elevator system. On the other hand, the object may refer to a person residing in the elevator car 102 or outside the elevator car 102 in the elevator shaft 100, for example, on the roof of the elevator car 102 or in a pit 106 of the elevator shaft 100. Based on the reflected signals, it is possible to identify at least one person. Radio signals reflecting from a living person may have distinguishing features that help in the identification process. Further, as the person may not be completely stationary but moves, this also may help in the identification process. Further, it may even be possible to measure and identify small movements or a respiration rate of the person based on the reflected signals. Thus, for example, if it is determined that the person is completely stationary or almost stationary, this can be used to identify potentially dangerous situations.

In an embodiment, the transmission of the radio frequency signals is triggered before causing movement of the elevator car 102. This provides additional security as every time the elevator car 102 moves, a check is made whether there is a person in the elevator shaft or not.

Further, in an embodiment, based on the identification process it is identified that there is a person on the roof of the elevator car 102. In response to the identification, the elevator system allows operation of the elevator car in the elevator shaft 100 only in a service mode. When detecting a person (for example, an unauthorized, a maintenance or a rescuing person) on the elevator car roof, additional security is provided for the person as the elevator system leaves room for the person against the elevator shaft 100 ceiling.

Further, in another embodiment, based on the identification process may be detected or identified in real-time that there is a person on the roof of the elevator car 102. In response to the identification, the elevator system may allow normal or limited operation of the elevator car in the elevator shaft 100. However, if the elevator car passes a specific point in the elevator shaft and the person is still detected on the roof of the elevator car 102, a control system of the elevator 102 may automatically stop the elevator car 102.

In an embodiment, based on the identification process, it is identified that there is a person in the elevator shaft, for example, in the pit 106. In response to the identification, the elevator system restricts movements of the elevator car 102 in the elevator shaft. This provides additional security for the person as the elevator system leaves room for the person in the pit 106. The person in the pit 106 may be a maintenance person during maintenance of the elevator system.

Further, as it is possible to identify a person in the elevator shaft or on the roof of the elevator car, this enables minimization of the size/sizes of a safety zone/zones at the bottom and top of the elevator shaft. In an embodiment, a safety zone/zones at the bottom and top of the elevator shaft could even be removed as it is possible to identify a person in the elevator shaft or on the roof of the elevator car. Thus, a radio frequency sensor or sensors can be used as a safety device in the elevator system.

In an embodiment, based on the identification process, the number of passengers in the elevator car 102 is determined. Although the number of passengers may be estimated using other techniques, for example, by a load weighting device, the number of passengers determined based on the identification process may provide confirmative information or even more accurate information than the already existing technique for estimating the number of passengers. The determined number of passengers may be taken into account in call allocations in the elevator system. For example, if the identification process indicates that an elevator car already carries its maximum number of passengers, new calls may be rejected for the elevator car until it has again room for new passengers. Thus, unnecessary stops can be avoided and people flow capacity of elevators is improved in the elevator system.

In an embodiment, based on the identification process, it can be determined that at least one passenger leans against or is too close to elevator car doors 114 or landing doors 108. Based on the determination, opening of the elevator car doors 114 or landing doors 108 may be presented when identifying that at least one passenger leans against or is too close to the elevator car doors 114 or landing doors 108. Thus, passenger safety is increased when preventing the doors being opened causing possible injuries to the fingers and hands of the passengers.

In an embodiment, based on the identification process, it can be determined that there is a passenger (or passengers) in the elevator car 102 but that the passenger is motionless in the elevator car 102. A timer may be associated with the passenger being motionless, and when the timer expires (for example, the passenger is motionless for one minute), an emergency action may be initiated. The emergency action may mean that the elevator car 102 is driven to a base floor or to other predetermined floor where the motionless person is detected with minimum waiting time, and the elevator car doors are automatically opened once the elevator car reaches the base floor or the other predetermined floor. In another embodiment, a call may be automatically established to a control center or to other predetermined maintenance or service number from the elevator car. If the recipient fails to communicate with the motionless passenger in the elevator car, the contact center may initiate a further action.

Figure 1B:
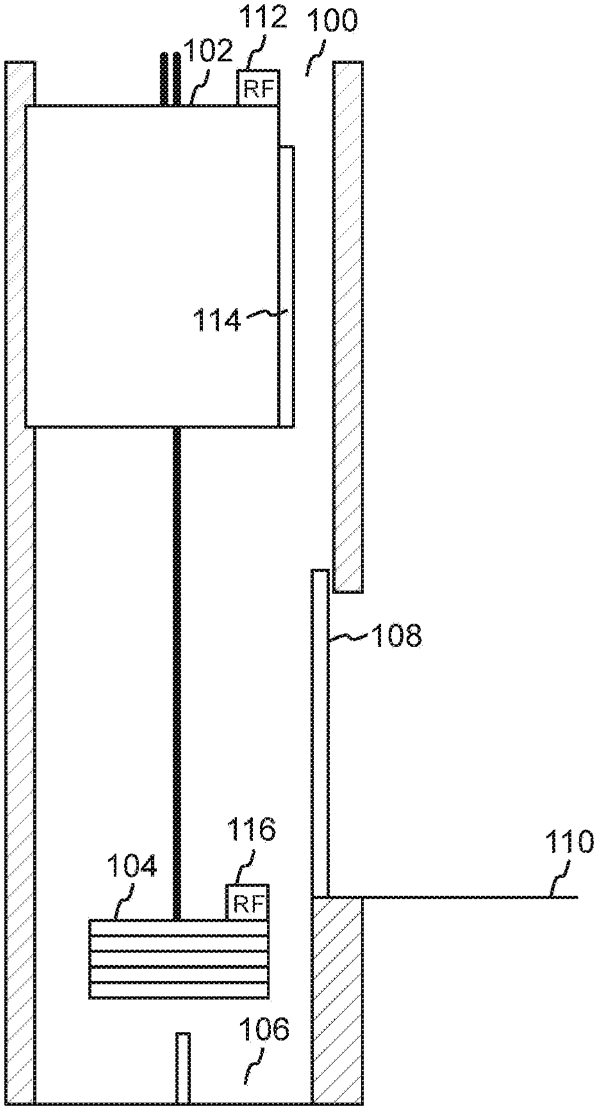
FIG. 1B illustrates an elevator system according to another embodiment.

FIG. 1B illustrates an elevator system according to another embodiment. The embodiment illustrated in FIG. 1B is similar to the one illustrated in FIG. 1A with the exception that in FIG. 1B there is a second radio frequency sensor 116 attached to the counterweight 104. The second radio frequency sensor may be configured to direct its transmission towards the landing doors 108. In other words, the second radio frequency sensor 116 may be caused to transmit radio frequency signals every time it passes or is in vicinity of a floor or floors. By scanning every floor, the elevator system gets information whether there are passengers waiting at the floors.

In another embodiment, the radio frequency signals of the second radio frequency sensor 116 may be directed vertically as previously discussed relating to the radio frequency sensor 112 attached to the elevator car 102.

In another embodiment, the second radio frequency sensor 116 may be caused to transmit radio frequency signals only towards floors from which a landing call has just been received. This may provide additional information for the determination which elevator car to allocate to the landing call.

Yet in another embodiment, more than one radio frequency sensor may be attached to the elevator car 102 and/or the counterweight. In an embodiment, radio frequency signals from a first radio frequency sensor may be directed vertically whereas radio frequency signals from a second radio frequency sensor may be directed horizontally. This enables scanning floors for waiting passengers and also the elevator shaft 100 and/or elevator car 102 for persons in the elevator shaft 100 and/or elevator car 102. When enabling both vertical and horizontal scanning, both the security in the elevator shaft 100 is increased and also the number of passengers in the elevator car 102 or waiting at the floors can be determined thus making call allocation in the elevator system more efficient.

In FIGS. 1A and 1B, the radio frequency signals transmitted by the radio frequency sensor 112, 116 may comprise Wi-Fi signals. Further, the processing of the measurement data from the radio frequency sensors may be performed by the elevator system itself or alternatively by an external entity from the elevator system, for example, by cloud processing.

Figure 2:
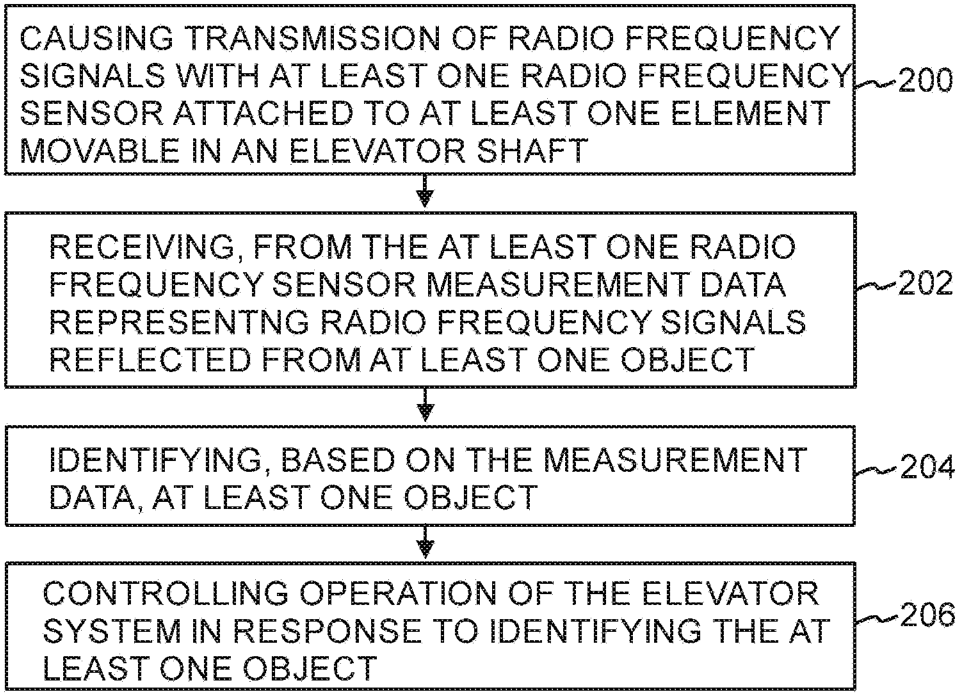
FIG. 2 illustrates a method for controlling an elevator system according to an embodiment.

FIG. 2 illustrates a method for controlling an elevator system according to an embodiment.

At 200, transmission of radio frequency signals is caused with at least one radio frequency sensor attached to at least one element movable in an elevator shaft of an elevator system. The radio frequency signals may comprise Wi-Fi signals. In another embodiment, it is possible to use other radio technologies.

At 202 measurement data representing radio frequency signals reflected from at least one object and captured with the at least one radio frequency sensor is received from the at least one radio frequency sensor.

At 204 identification, based on the measurement data, of at least one object is caused. In an embodiment, an object refers to a person. The identification process may be performed by the elevator system itself. Alternatively, it can be performed by an external entity from the elevator system, for example, by a cloud service.

Figure 3:
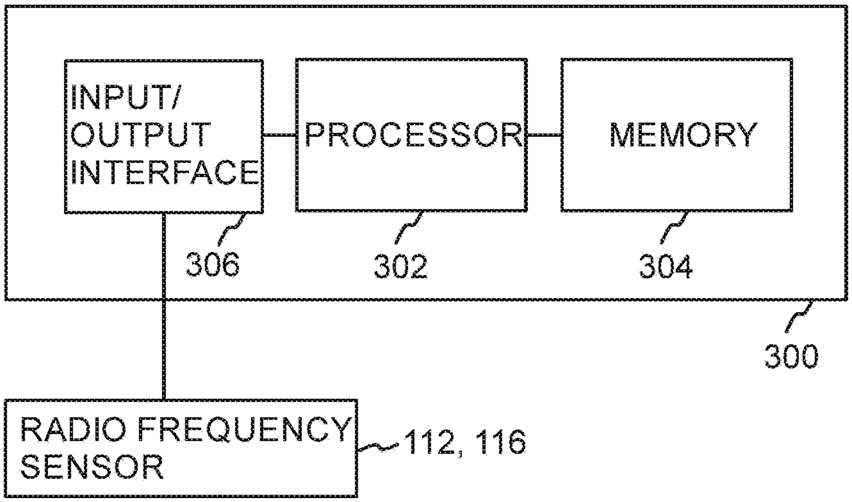
FIG. 3 illustrates a block diagram of a control apparatus according to an embodiment.

At 206 operation of the elevator system is controlled in response to identifying the at least one object based on the measurement data. "Controlling operation" may refer to various actions, for example, relating to safety of the elevator system or to call allocation in the elevator system. In an embodiment, the controlling may refer to an action due to a change or changes identified in an elevator shaft or an elevator car. For example, the identification may indicate that some element or elements may have broken down in the elevator shaft. The identification may also indicate that some element is protruding through a landing door towards the elevator shaft. In case of an earthquake, the earthquake may detach elements in the elevator shaft or in the elevator car. The action may be, for example, a service need proposal, an immediate service request, a stop command for the elevator car (for example, when a problem is identified in a counterweight, doors, or ropes or that a loose object or objects reside in the elevator shaft) etc. FIG. 3 illustrates a block diagram of a control apparatus according to an embodiment. The control apparatus 300 comprises at least one processor 302 connected to at least one memory 304. The at least one memory 304 may comprise at least one computer program which, when executed by the processor 302 or processors, causes the apparatus 300 to perform the programmed functionality. The apparatus 300 may also comprise an input/output interface 306. Via the input/output interface 306, the control apparatus may be connected to at least one radio frequency sensor 11, 116. The illustrated components are not required or all-inclusive, as any components can deleted and other components can be added.

The apparatus 300 may be a control entity configured to implement only the above disclosed operating features, or it may be part of a larger elevator control entity, for example, a group controller.

The apparatus 300 comprises means for causing transmission of radio frequency signals with at least one radio frequency sensor attached to at least one element movable in an elevator shaft of an elevator system, means for receiving, from the at least one radio frequency sensor, measurement data representing radio frequency signals reflected from at least one object and captured with the at least one radio frequency sensor, means for causing identification, based on the measurement data, of at least one person, and means for controlling operation of the elevator system in response to identifying the at least one person based on the measurement data. The above means may be implemented, for example, using at least one processor 302, at least one processor 302 and at least one memory 304 connected to the at least one processor 302, or at least one processor 302, at least one memory 304 connected to the at least one processor 302 and an input/output interface 306 connected to the at least one processor 302.

The exemplary embodiments of the invention can be included within any suitable device, for example, including, servers, workstations, personal computers, laptop computers, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for controlling an elevator system, the method comprising:

causing transmission of radio frequency signals with at least one radio frequency sensor attached to at least one element movable in an elevator shaft of an elevator system;

receiving, from the at least one radio frequency sensor, measurement data representing radio frequency signals reflected from at least one object and captured with the at least one radio frequency sensor;

causing identification, based on the measurement data, of at least one object; and controlling operation of the elevator system in response to identifying the at least one object based on the measurement data;

wherein the radio frequency signals comprise Wi-Fi signals.

2. A method according to claim 1, comprising:

identifying, based on the measurement data, a person on the roof of an elevator car; and allowing operation of the elevator car in the elevator shaft only in a service mode.

3. A method according to claim 1, comprising:

identifying, based on the measurement data, a person in the elevator shaft; and restricting movements of an elevator car in the elevator shaft.

4. A method according to claim 2, further comprising:

triggering the transmission of the radio frequency signals with the at least one radio frequency sensor before causing movement of the elevator car.

5. A method according to claim 1, comprising:

determining the number of passengers in an elevator car based on the identifying; and taking into account the determined number of passengers in call allocations in the elevator system.

6. A method according to claim 1, comprising:

identifying, based on the measurement data, at least one passenger leaning against or being too close to elevator car doors or landing doors; and preventing opening of the elevator car doors or landing doors when identifying, based on the measurement data, the at least one passenger leaning against or being too close to the elevator car doors or landing doors.

7. A method according to claim 1, comprising:

receiving a landing call;

triggering the transmission of the radio frequency signals with the at least one radio frequency sensor when being in the vicinity of the floor from which the landing call was received;

determining, based on the measurement data, the number of passengers waiting at the floor from which the landing call was received; and taking into account the determined number of passengers when allocating the landing call.

8. A method according to claim 1, comprising:

identifying, based on the measurement data, at least one passenger in an elevator car;

determining, based on the measurement data, that the at least one passenger is motionless in the elevator car; and initiating an emergency action.

9. A method according to claim 1, wherein the at least one element movable in an elevator shaft comprises at least one of:

an elevator car; and a counterweight of the elevator car.

10. A non-transitory computer-readable medium storing a computer program comprising program code, which when executed by at least one processor, causes the at least one processor to perform the method of claim 1.

11. A control apparatus of an elevator system, the control apparatus comprising:

memory storing an elevator system control program; and a processor configured to execute the elevator system control program to:

cause transmission of radio frequency signals with at least one radio frequency sensor attached to at least one element movable in an elevator shaft of an elevator system;

receive, from the at least one radio frequency sensor, measurement data representing radio frequency signals reflected from at least one object and captured with the at least one radio frequency sensor;

cause identification, based on the measurement data, of at least one object; and control operation of the elevator system in response to identifying the at least one object based on the measurement data;

wherein the radio frequency signals comprise Wi-Fi signals.

12. A control apparatus according to claim 11, the processor further being configured to:

identify, based on the measurement data, a person on the roof of an elevator car; and allow operation of the elevator car only in a service mode.

13. A control apparatus according to claim 11, the processor further being configured to:

identify, based on the measurement data, a person in the elevator shaft; and restrict movements of an elevator car in the elevator shaft.

14. A control apparatus according to claim 12, the processor further being configured to:

trigger the transmission of the radio frequency signals with the at least one radio frequency sensor before causing movement of the elevator car.

15. A control apparatus according to claim 11, the processor further being configured to:

determine the number of passengers in an elevator car based on the identifying; and take into account the determined number of passengers in call allocations in the elevator system.

16. A control apparatus according to claim 11, the processor further being configured to:

identify, based on the measurement data, at least one passenger leaning against or being too close to elevator car doors or landing doors; and prevent opening of the elevator car doors or landing doors when identifying, based on the measurement data, the at least one passenger leaning against or being too close to the elevator car doors or landing doors.

17. A control apparatus according to claim 11, the processor further being configured to:

receive a landing call;

trigger the transmission of the radio frequency signals with the at least one radio frequency sensor when being in the vicinity of the floor from which the landing call was received;

determine, based on the measurement data, the number of passengers waiting at the floor from which the landing call was received; and take into account the determined number of passengers when allocating the landing call.

18. A control apparatus according to claim 11, the processor further being configured to:

identify, based on the measurement data, at least one passenger in an elevator car;

determine, based on the measurement data, that the at least one passenger is motionless in the elevator car; and initiate an emergency action.

19. A control apparatus according to claim 11, wherein the at least one element movable in an elevator shaft comprises at least one of:

an elevator car; and a counterweight of the elevator car.

20. An elevator system comprising:

an elevator shaft;

at least one element movable in the elevator shaft;

at least one radio frequency sensor attached in the at least one element; and a control apparatus of claim 11.

* * * * *